May 6, 1958 E. S. CHRISTENSEN 2,833,383
CLUTCH
Filed May 13, 1955
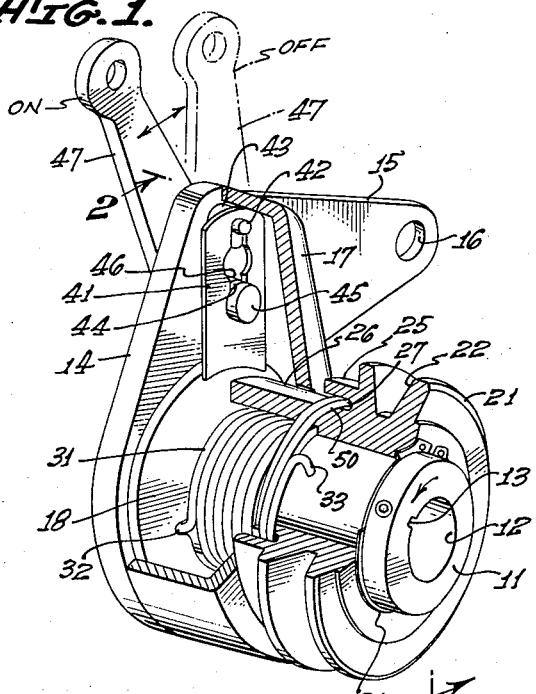
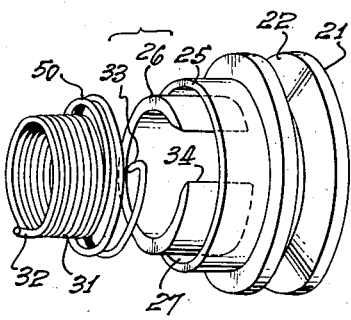
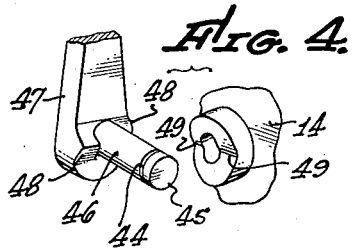
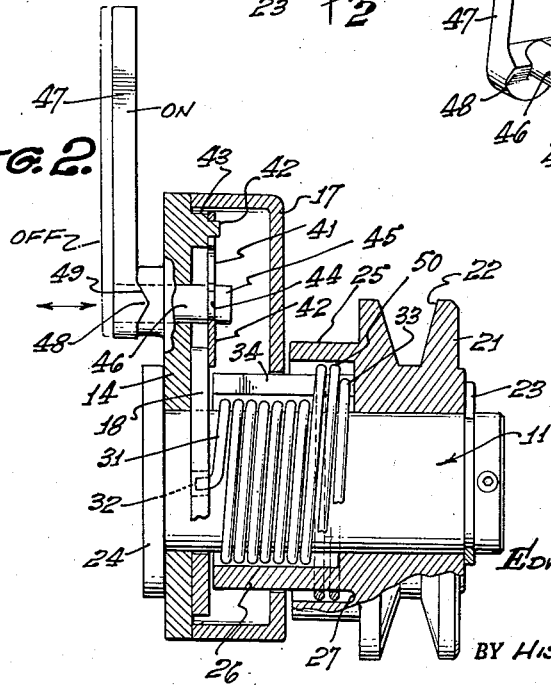
EDWIN S. CHRISTENSEN,
INVENTOR.
BY HIS ATTORNEYS.
HARRIS, KIECH, FOSTER & HARRIS.

United States Patent Office 2,833,383
Patented May 6, 1958

2,833,383

CLUTCH

Edwin S. Christensen, Long Beach, Calif.

Application May 13, 1955, Serial No. 508,019

4 Claims. (Cl. 192—41)

The invention may be briefly summarized as embodied in a clutch for locking a driven member on a driving shaft or collar rigidly secured to said shaft, by causing a spring to be constricted about the shaft or collar. The clutch is characterized by means by which the constriction of the spring can be initiated by application of a very small force.

Certain objects and advantages will be made evident hereinafter.

Referring to the drawing, which is for illustrative purposes only:

Fig. 1 is a perspective view of one embodiment of the invention, a portion of this figure being cut away to better illustrate internal structure;

Fig. 2 is a view of this embodiment partly in section on a central plane;

Fig. 3 is an exploded perspective view of the coil spring and the pulley;

Fig. 4 is an exploded view of the means for activating the clutch.

In the embodiment of the clutch as shown in these drawings a sleeve 11 is the driving member, this sleeve turning in a counter-clockwise direction, as seen in Fig. 1, this direction being indicated by an arrow shown on the end of the sleeve 11 as shown in Fig. 1. The sleeve has a bore 12 with a keyway 13 by which the sleeve may be rigidly secured on a driving shaft, not shown, for example, the shaft of an electric or gasoline motor.

The sleeve 11 projects through, rotates in, and supports a stationary member 14. This member has a lug 15 which has a hole 16 therein through which a bolt, not shown, may connect the structure 14 to a motor frame or other stationary structure so that the member 14 cannot rotate about the axis of the sleeve 11. A cover 17 is secured by a screw (not shown) to the member 14. Rotatable on, but not turning with the sleeve when the clutch is not engaged, is a washer 18, one side of this washer abutting against the inner surface of the member 14. The sleeve 11 drives a driven pulley 21 having a conventional belt groove 22 when the clutch is engaged, and turns freely inside the pulley 21 when the clutch is disengaged. One end of the sleeve 11 has a shouldered ring 24 which abuts loosely against the outer side of the member 14, the other end of the sleeve 11 having a split ring 23 which abuts loosely against the outer face of the pulley 21.

Formed integrally with the pulley 21 are an outer cylinder 25 and an inner cylinder 26. The inner end of the inner cylinder 26 passes through the cover 17 and abuts loosely on the inner side of the washer 18 and the inner end of the outer cylinder 25 abuts loosely on the outer side of the cover 17. There is space between sleeve 11 and the inner cylinder 26 for a coil spring 31. There is space between the two cylinders 25 and 26 for one end of the spring 31. The inner cylinder 26 has a slot 34 formed therein. The spring is formed in two coils, one of which is placed to engage the sleeve 11. The spring then passes through the slot 34 formed in the inner cylinder 26 and forms a somewhat larger coil which engages the inner cylinder 26. The inner end 32 of the smaller coil is hooked into and thereby attached to the washer 18, and the outer end 33 of the larger coil hooks over the edge of the slot 34 and thus attaches the spring 31 to the pulley 21. The spring 31 is so wound that it is expanded a little by the sleeve 11 and the inner cylinder 26 and tends to grip both the sleeve and cylinder unless restrained.

A spring steel plate detent 41 is so placed as to allow its lower end to engage a portion of the inner face of the washer 18 and to force the outer face of this washer against the inner face of the member 14 when it is desired to disengage the clutch. The detent 41 includes a central portion which engages a groove 44 near the inner end 45 of a pin 46. The upper end of the detent 41 engages a projection 42 of reduced diameter of an abutment 43 carried on the member 14.

The clutch is disengaged and engaged by a lever 47 which can be moved to either the "off" or "on" position as shown in Fig. 1. The lever 47 is integral with and pivoted on the pin 46 and has a cam member 48 which a cam portion 49 on the member 14 engages (see Fig. 4). When the lever 47 is in the "off" position, the pin 46 is pulled out and causes the lower end of the detent 41 to force the outer face of the washer 18 against the inner face of the member 14, this force being released when the lever 47 is moved to the "on" position.

The method of operation of the clutch is as follows:

The lever 47 being in the "off" position as shown in phantom in Figs. 1 and 2, the outer face of the washer 18 is pressed against and frictionally engages the inner face of the member 14. We may assume that some load is driven by the pulley 21 by a belt (not shown). If now the driving motor is started, the sleeve starts to rotate in a counter-clockwise direction as shown in Fig. 1 by the arrow on the end of the sleeve 11. There will be some slight drag of the sleeve 11 on the spring 31. The end 32 is, however, held stationary by the washer 18 and only the end 33 can move. Such a movement in a counter-clockwise direction can only serve to uncoil the spring 31 and thus lessen the drag. The sleeve 11 thus rotates with very little friction inside the spring. If, however, the lever 47 is moved to the "on" position, as shown in Fig. 1, the friction between the washer 18 and the inner face of the member 14 is almost entirely eliminated and the drag on the spring 31 tends to pull the end 32 of that spring in the direction of rotation of the sleeve 11. This tightens up both coils of the spring and causes the small coil to grip the sleeve and be driven by the sleeve and causes the larger coil to grip the inner cylinder 26 and thus drive the pulley 21.

If now the lever is moved to the "off" position again, the detent 41 forces the washer into good frictional contact with the inner face of the member 14. This stops the end 32 of the spring 31 and any frictional grip of the spring on the sleeve tends to uncoil the spring and release this grip and release any tendency of the spring to drive the pulley.

If while the lever 47 is on the "on" position, that is, with the detent not strongly engaging the washer 18, the load overruns and the pulley 21 rotates faster than the sleeve 11, the clutch will "free wheel" and allow the pulley to so run faster without restraint from the clutch.

I claim as my invention:

1. In a clutch, the combination of: a stationary member; a sleeve adapted to be rotated in a positive direction about an axis passing through said member, said sleeve being journalled in said member; a washer mounted to rotate on said sleeve, said washer being so placed that it can frictionally engage a stationary surface on said member; a driven member carried on and free to rotate on said sleeve; a spring having its inner end secured to said washer and its outer end secured to said driven member, the wire of said spring winding around said sleeve away from its inner end in a negative direction; a detent secured to said stationary member, said detent having an end positioned to press said washer to said stationary surface on said stationary member; and means by which an operator can so press said end of said detent against said washer.

2. In a clutch, the combination of: a stationary member; a sleeve adapted to be rotated in a positive direction about an axis passing through said member, said sleeve being journalled in said member; a washer mounted to rotate on said sleeve, said washer being so placed that it can frictionally engage a stationary surface on said member; a driven member carried on and free to rotate on said sleeve; a spring having its inner end secured to said washer and its outer end secured to said driven member, the wire of said spring winding around said sleeve away from its inner end in a negative direction, a portion of said spring being so placed as to engage said sleeve and a portion of said spring being so placed as to engage an inner cylinder forming a portion of said driven member; a detent secured to said stationary member, said detent having an end positioned to press said washer to said stationary surface on said stationary member; and means by which an operator can so press said end of said detent against said washer.

3. In a clutch, the combination of: a stationary member; a sleeve adapted to be rotated in a positive direction about an axis passing through said member, said sleeve being journalled in said member; a washer mounted to rotate on said sleeve, said washer being so placed that it can frictionally engage a stationary surface on said member; a driven member carried on and free to rotate on said sleeve; a spring having its inner end secured to said washer and its outer end secured to said driven member, the wire of said spring winding around said sleeve away from its inner end in a negative direction; a detent secured to said stationary member, said detent having an end positioned to press said washer to said stationary surface on said stationary member; a pin journalled in said stationary member and engaging said detent; a lever to which said pin is rigidly connected; and cam means acting between said pin and said member to force said pin to actuate said detent.

4. In a clutch, the combination of: a stationary member; a sleeve adapted to be rotated in a positive direction about an axis passing through said member, said sleeve being journalled in said member; a washer mounted to rotate on said sleeve, said washer being so placed that it can frictionally engage a stationary surface on said member; a driven member carried on and free to rotate on said sleeve; a spring having its inner end secured to said washer and its outer end secured to said driven member, the wire of said spring winding around said sleeve away from its inner end in a negative direction, a portion of said spring being so placed as to engage said sleeve and a portion of said spring being so placed as to engage an inner cylinder forming a portion of said driven member; a detent secured to said stationary member, said detent having an end positioned to press said washer to said stationary surface on said stationary member; a pin journalled in said stationary member and engaging said detent; a lever to which said pin is rigidly connected; and cam means acting between said pin and said member to force said pin to actuate said detent.

References Cited in the file of this patent

UNITED STATES PATENTS

| 2,551,739 | Harlan | May 8, 1951 |
| 2,685,949 | Dunlap | Aug. 10, 1954 |

FOREIGN PATENTS

| 507,207 | France | Dec. 9, 1919 |